No. 636,200. Patented Oct. 31, 1899.
J. K. FRINK.
TILE FLOORING.
(Application filed Apr. 12, 1899.)
(No Model.)
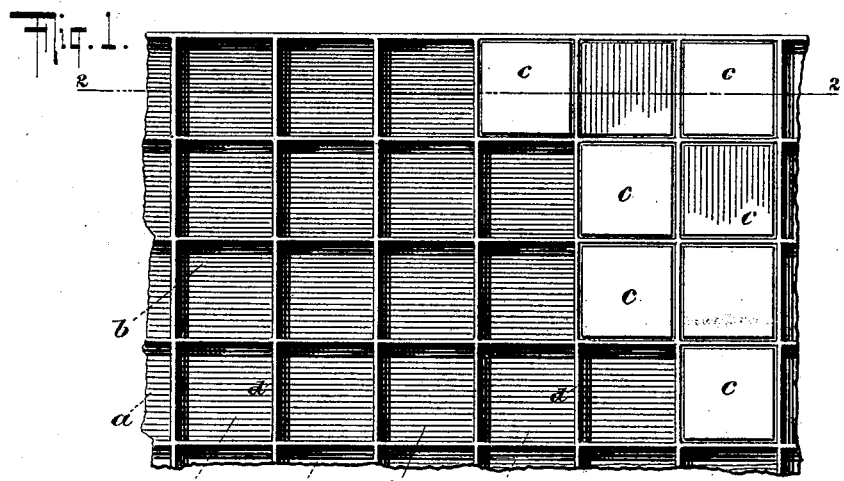
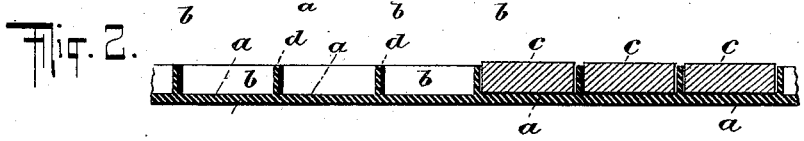
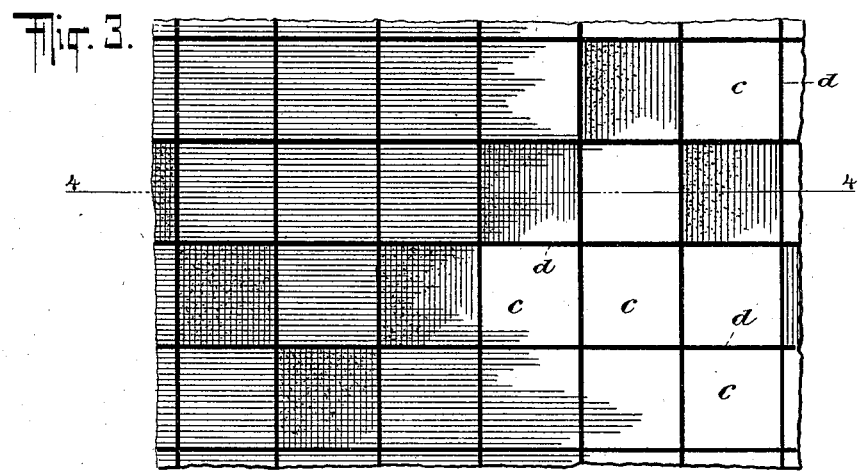
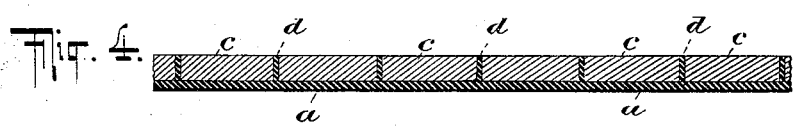
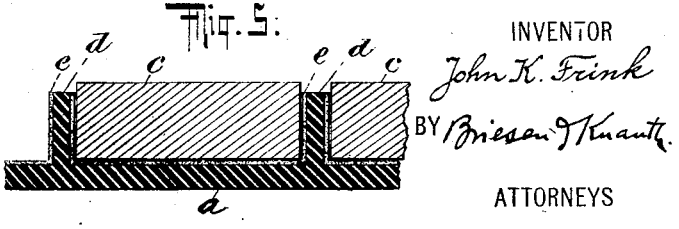
WITNESSES:
INVENTOR
John K. Frink
BY Briesen & Knauth
ATTORNEYS

UNITED STATES PATENT OFFICE.

JOHN K. FRINK, OF NEW YORK, N. Y.

TILE FLOORING.

SPECIFICATION forming part of Letters Patent No. 636,200, dated October 31, 1899.

Application filed April 12, 1899. Serial No. 712,713. (No model.)

*To all whom it may concern:*

Be it known that I, JOHN K. FRINK, a citizen of the United States, residing in the borough of Brooklyn, county of Kings, city and State of New York, have invented certain new and useful Improvements in Tile Flooring, of which the following is a specification.

My invention relates to tile flooring, and has for its object to produce a compact, easily-laid, and durable structure.

My invention will be described with special reference to the accompanying drawings, wherein I have shown one embodiment of my invention.

In the drawings, Figure 1 is a plan view of the tile flooring assembled prior to the act of vulcanization. Fig. 2 is a section on line 2 2 of Fig. 1. Fig. 3 is a plan view of the structure fully vulcanized. Fig. 4 is a section on line 4 4 thereof. Fig. 5 is an enlarged fragmentary transverse section clearly showing the parts of the flooring assembled ready for vulcanization.

In producing the construction shown in the drawings I first take a base or sheet of a cellular or honeycomb character. This sheet is shown in the figures and lettered $a$. It will be observed that the cells are provided with bottoms which are integral with the sides of the cells, and the cells are to be distinguished from apertures extending entirely through the base. The cells are lettered $b$ in the drawings, and it is my intention when constructing this embodiment of my invention to form the said cellular base in a mold from green or semivulcanized rubber stock or rubber compound. In the cells $b$ of the base I place blocks $c$, also preferably of semivulcanized rubber stock or compound, and interpose between the blocks $c$ and the side walls $d$ of the cells a film or layer or films or layers of adhesive rubber or cement $e$. The process so far is represented in Figs. 1, 2, and 5. The flooring thus prepared is subsequently fully vulcanized, as shown in Figs. 3 and 4, wherein the blocks $c$ appear, preferably, with separatrices $d$ (the side walls of the cells) between them. It will be observed that the layer or film of adhesive rubber $e$ does not appear in Figs. 3 and 4, and it will be understood that the said layer or film is shown exaggerated in Fig. 5 for the purpose of illustration. It will likewise be noted that in Figs. 3 and 4 the tops of the blocks $c$ are shown flush with the tops of the separatrices $d$. They are pressed into this position by the vulcanizing-press, which is the preferred practice, and the construction wherein the surface of the tile flooring is flush is the preferred construction. These separatrices $d$ give the effect of a joint between adjacent blocks.

Having described my invention, what I claim, and desire to secure by Letters Patent, is—

As a new article of manufacture, a vulcanized rubber tiling comprising cells with closed bases and side walls integral with each other, blocks of vulcanized rubber located in the cells and a rubber layer or layers permanently uniting said blocks to the inner surfaces of said cells.

JOHN K. FRINK.

Witnesses:
   GEO. E. MORSE,
   OTTO V. SCHRENK.